United States Patent [19]

Grohmann

[11] Patent Number: 4,953,358
[45] Date of Patent: Sep. 4, 1990

[54] COOLING DEVICE FOR LIQUEFIED GAS

[75] Inventor: Paul Grohmann, Maria-Enzersdorf, Fed. Rep. of Germany

[73] Assignee: Messer Griesheim GmbH, Fed. Rep. of Germany

[21] Appl. No.: 322,194

[22] Filed: Mar. 13, 1989

[30] Foreign Application Priority Data

Mar. 19, 1988 [DE] Fed. Rep. of Germany ....... 3809290

[51] Int. Cl.$^5$ .............................................. F17C 13/00
[52] U.S. Cl. ...................................... 62/50.7; 148/9 R
[58] Field of Search ................. 62/50.1, 50.7; 148/9 R

[56] References Cited

U.S. PATENT DOCUMENTS

| 2,205,499 | 6/1940 | Smith | 148/9 R |
|---|---|---|---|
| 3,433,028 | 3/1969 | Klee | 62/50.7 |
| 3,466,886 | 9/1969 | Doose et al. | 62/50.7 |
| 3,706,208 | 12/1972 | Kadi et al. | 62/50.7 |
| 4,036,617 | 7/1977 | Leonard et al. | 62/50.7 |
| 4,576,015 | 3/1986 | Crawford | 62/50.7 |
| 4,715,187 | 12/1987 | Stearns | 62/50.1 |
| 4,745,760 | 5/1988 | Porter | 62/50.7 |
| 4,765,846 | 8/1988 | Grohmann | 148/9 R |

Primary Examiner—Ronald C. Capossela
Attorney, Agent, or Firm—Connolly and Hutz

[57] ABSTRACT

A cooling device for cooling a liquefied gas having a low boiling point includes two cooling gas containers connected to each other by vacuum-insulated cooling-line segments. The liquid-gas line runs continuously through the cooling-line segments and the cooling-gas containers.

17 Claims, 2 Drawing Sheets

COOLING DEVICE FOR LIQUEFIED GAS

BACKGROUND OF INVENTION

When cutting with a high-pressure, liquid-oxygen jet as is known, for example, from U.S. Pat. No. 4,765,846, the pressure of the oxygen, which is kept at the boiling point in the tank, is raised to 500 bar by means of a high-pressure oxygen pump. The outlet pressure from the cutting nozzle is regulated by means of a relief valve. The great momentum results in a high cutting speed of this cutting process. For the purpose of eliminating the heat resulting from friction and compression forces, it is necessary to cool down the oxygen with a cooling medium, for example, liquid nitrogen. In order to keep the lines between the high-pressure pump, the cooling device and the cutting torch as short as possible, the required cooling device is mounted together with these other units on a shared frame and moved along with the guiding cutter. For this reason, this part of the system must be light and have a low center of gravity.

There is a cooling device known from U.S. Pat. No. 2,205,499, in which the spiral gas line to be cooled is submerged in an insulated container filled with liquid air. The use of such a design to cool a high-pressure liquid-gas line entails a large diameter of the line spiral due to the thick walls of the high-pressure pipe. For the same reason, the container in which the spiral is submerged also has a large diameter and, consequently, a large structural volume.

Moreover, the cooling medium situated in the center of the container does not contribute to the cooling process and has to be carried as "dead weight". This problem could be solved, for example, by inserting a displacement element into the container; however, such a solution still does not eliminate the large volume.

SUMMARY OF INVENTION

The invention is based on the task of creating a cooling device which allows for low structural height, compact design and reduced weight.

With the proposed cooling-gas container/cooling-line segment arrangement, it is possible to have a liquid cooling medium continuously circulating around the gas lines to be cooled, thus achieving an optimum cooling effect. Moreover, this solution also allows for a design with a low structural height and low weight, and in which the internal space can be utilized in such a way that it is possible, for example, to install the high-pressure pump there.

THE DRAWINGS

FIG. 1 is a side view of the cooling device of this invention;
FIG. 2 is a top view of the cooling device of FIG. 1;
FIG. 3 is a section along line A—A in FIG. 2; and
FIG. 4 is a section along line B—B in FIG. 2.

DETAILED DESCRIPTION

Figure 1:
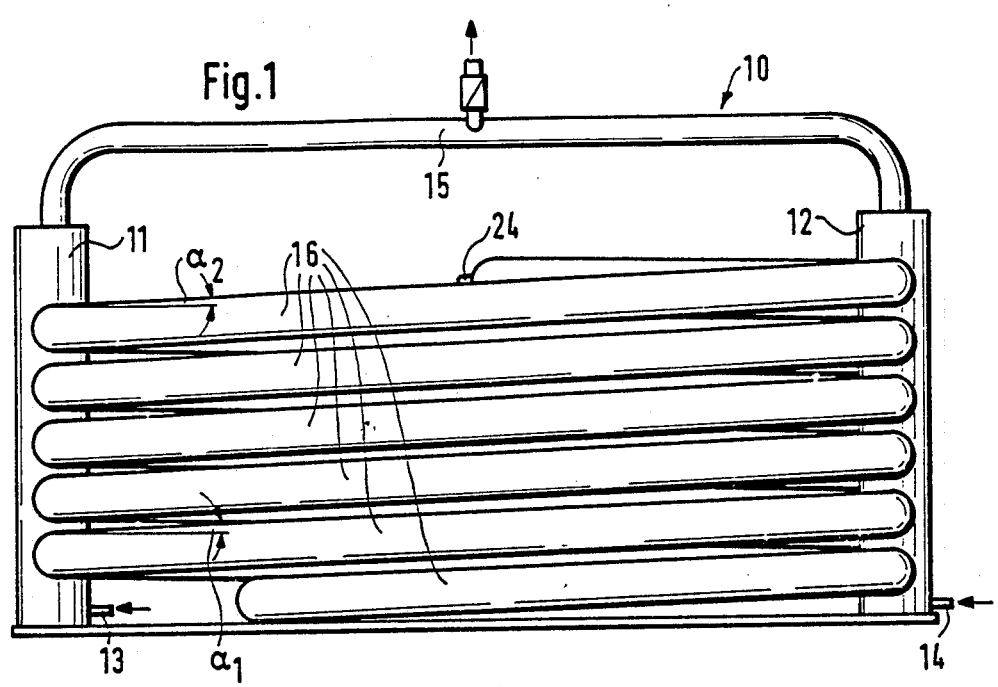

The cooling device, represented in its entirety by the number 10, contains two insulated gas-cooling containers 11 and 12, which are preferably designed as stand pipes and affixed onto a base plate, and whose connection 13 or 14 is hooked up to a cooling-gas supply (which is not depicted here) in order to admit a liquefied cooling gas having a low-boiling point, preferably liquid nitrogen. In this process, level metering ensures a uniform supply of the liquid nitrogen. The stand pipes 11 and 12 are connected by means of a shared pipe 15, through which the resulting gaseous nitrogen can be carried off in a generally known way.

The stand pipes 11, 12 also serve as a support for the vacuum-insulated cooling-line segments 16, which are arranged parallel to each other at an ascending angle $a_1$ of, preferably, 3° to 30°, as shown in FIG. 1. This has the benefit of causing the nitrogen, now in buoyant gas form, to ascend and enter the stand pipes 11 and 12. It was found that it is especially advantageous when the angle $a_1$ constantly increases from one cooling-line segment to the next, for example, from an $a_1$-angle of 1° to an $a_2$-angle of 10°.

Figure 3:
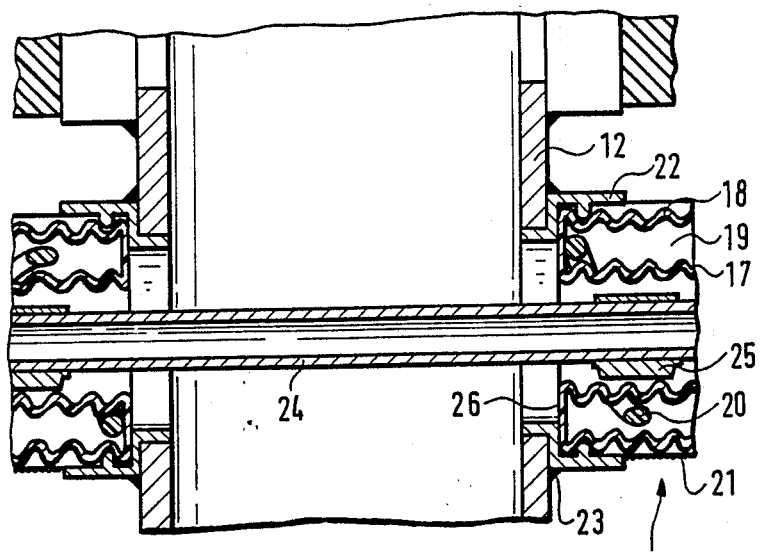
Figure 4:
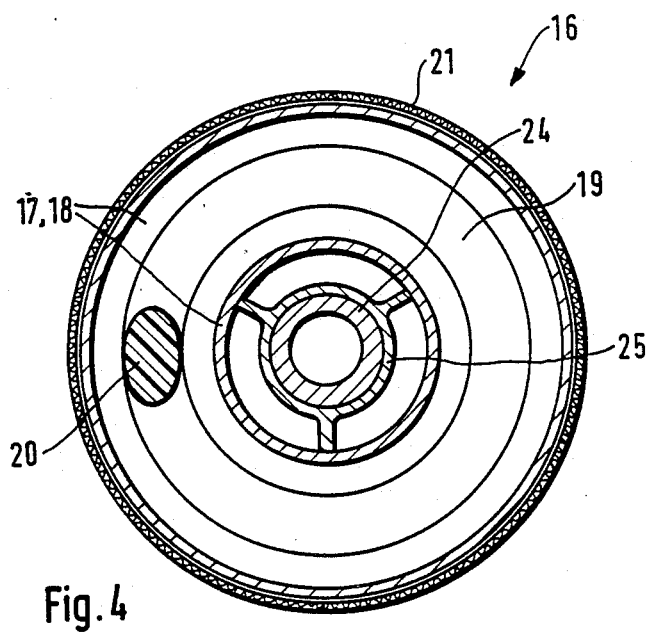

As can be seen in FIGS. 3 and 4, the vacuum-insulated cooling-line segments 16 have an inner 17 and an outer 18 corrugated hose whose ends are connected/sealed and vacuum-insulated, In the vacuum 19 existent between the hoses 17, 18, there is a plastic spiral 20 which serves as a spacer. The outer corrugated hose 18 is completely sheathed by stainless-steel mesh 21. The cooling-line segments 16 are connected, for example by welding points 23, to openings in the stand pipes 11 and 12 via holders 22, which are attached to the hose ends so as to be liquid-tight.

Figure 2:
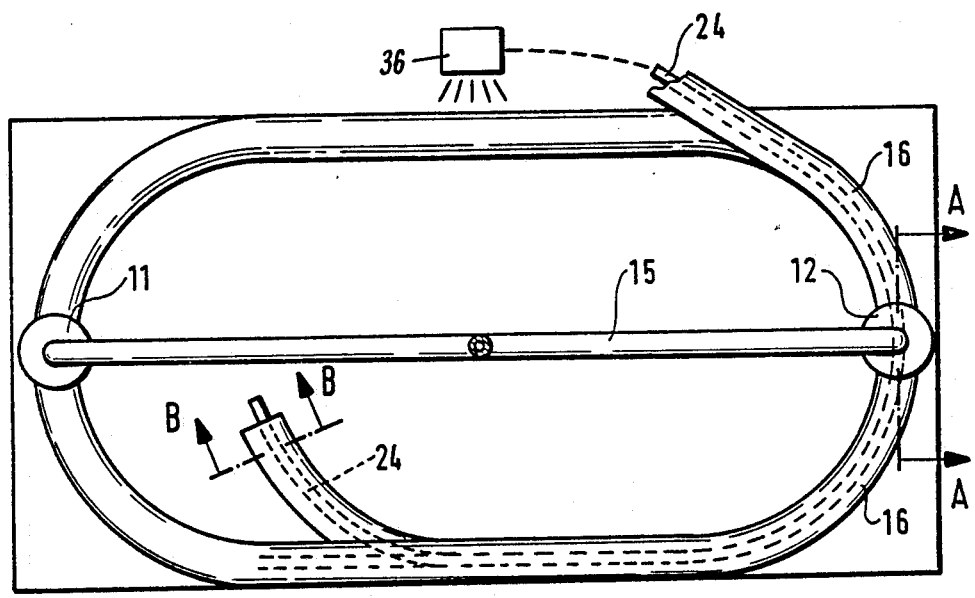

As can be seen especially in FIG. 2, the liquid-gas line 24 to be cooled, runs continuously (preferably in the form of a spiral) through the cooling segments and the cooling-gas containers 11 and 12; in this process, according to FIG. 3, the liquid-gas line 24 penetrates the cooling containers 11 and 12 and is not interrupted inside the containers 11 and 12. The liquid-gas line 24, which should preferably be designed as a high-pressure copper pipe, is held in place inside the cooling-line segments 16 by means of star-shaped holders 25 made of plastic. The pipeline is precisely centered in such a way that there is a ring-shaped space between the liquid-gas line 24 and the inner corrugated hose 17 for the nitrogen used for cooling.

The arrangement described above has the benefit of making it possible to install long liquid-gas lines which have to be cooled, without having to give up space inside the pipe spiral. Moreover, the weight is reduced since the nitrogen in this embodiment is only located along the gas liquid line to be cooled.

The large pipe radius keeps the structure low and thus the center of gravity is favorable. Finally, the easy expansion possibilities of the system should be mentioned. A change in the dimensioning of the structure can be easily achieved by adding or removing some segments.

Therefore, the cooling device described above is especially well-suited for use in a device to cut workpieces by means of a jet of liquid oxygen which is cooled with liquid nitrogen. For this purpose, preference is given to the cooling device being mounted on the cutting machine 36 (illustrated schematically in FIG. 2) so that it can move together with it.

What is claimed is:

1. In a cooling device to cool a liquefied gas having a low boiling point, the improvement being first and second containers which are connected to each other by means of vacuum-insulated cooling-line segments having an inner and outer conduit wherein liquified gas continuously flows from said first container to the second container in one direction and cooling gas continuously flows in the outer conduit from said second container to the first container in counter current heat transfer thereto.

2. Cooling device according to claim 1, characterized in that said cooling-line segments are arranged parallel to each other.

3. Cooling device according to claim 2, characterized in that said cooling-line segments are arranged at an ascending angle $a_1/a_2$.

4. Cooling device according to claim 3, characterized in that said angle is between 3° and 30°.

5. Cooling device according to claim 3, characterized in that the angle $a_1/a_2$ increases from one cooling-line segment to the next.

6. Cooling device according to claim 5, characterized in that said first and second containers are designed as stand pipes.

7. Cooling device according to claim 6, characterized in that said vacuum-insulated cooling-line segments have an inner and an outer corrugated hose, the ends of said corrugated hoses being connected to each other, a plastic spiral being optionally in the vacuum existent between said hoses which serves as a spacer, and said outer corrugated hose being completely sheathed by a stainless-steel mesh.

8. Cooling device according to claim 7, characterized in that said inner and second runs in the form of a spiral through said cooling-line segments and said first and second containers.

9. Cooling device according to claim 8, characterized in that said inner conduit is held in said outer corrugated hose by star-shaped spacers.

10. Cooling device according to claim 9, characterized in that said inner conduit is a high pressure copper pipeline.

11. Cooling device according to claim 9, characterized by said device comprising means to cut workpieces by means of liquid oxygen which is cooled with liquid nitrogen wherein said liquified gas is oxygen and said cooling gas is nitrogen, whereby preference is given to the cooling device being mounted on the cutting machine so that it can move together with it.

12. Cooling device according to claim 1, characterized in that said cooling-line segments are arranged at an ascending angle $a_1/a_2$.

13. Cooling device according to claim 1, characterized in that said first and second containers are designed as stand pipes.

14. Cooling device according to claim 1, characterized in that said vacuum-insulated cooling-line segments have an inner and an outer corrugated hose, the ends of said corrugated hoses being connected to each other, a plastic spiral being optionally in the vacuum existent between said hoses which serves as a spacer, and said outer corrugated hose being completely sheathed by a stainless-steel mesh.

15. Cooling device according to claim 14, characterized in that said inner conduit is held in said inner conduit corrugated hose by star-shaped spacers.

16. Cooling device according to claim 1, characterized in that said liquid-gas line runs in the form of a spiral through said cooling-line segments and said first and second containers.

17. Cooling device according to claim 1, characterized by said device comprising means to cut workpieces by means of liquid oxygen which is cooled with liquid nitrogen wherein said liquified gas is oxygen and said cooling gas is liquid nitrogen, whereby preference is given to the cooling device being mounted on the cutting machine so that it can move together with it.

* * * * *